(12) United States Patent
Saitoh et al.

(10) Patent No.: US 6,445,147 B1
(45) Date of Patent: Sep. 3, 2002

(54) MOVABLE BODY CONTROL SYSTEM FOR VEHICLE

(75) Inventors: Yasushi Saitoh, Nagoya; Koichi Hirota, Anjyo; Tatsumi Tashiro; Shinji Suganuma, both of Toyota; Junkoh Shima, Nisshin, all of (JP)

(73) Assignee: Aisin Seiki Kabushiki Kaisha, Kariya (JP)

(*) Notice: Subject to any disclaimer, the term of this patent is extended or adjusted under 35 U.S.C. 154(b) by 0 days.

(21) Appl. No.: 09/686,988

(22) Filed: Oct. 17, 2000

(30) Foreign Application Priority Data

Oct. 19, 1999 (JP) ............................................ 11-297427

(51) Int. Cl.[7] ............................ H02P 1/54; H02P 5/46; H02P 7/68; H02P 7/74; H02P 7/80
(52) U.S. Cl. ........................................................ 318/34
(58) Field of Search ..................................... 318/34, 38

(56) References Cited

U.S. PATENT DOCUMENTS

| | | | | |
|---|---|---|---|---|
| 4,087,731 A | | 5/1978 | Rhoades | |
| 5,780,957 A | * | 7/1998 | Oliver et al. | 310/328 |
| 5,952,801 A | * | 9/1999 | Boisvert et al. | 318/468 |
| 6,056,352 A | * | 5/2000 | Ewing et al. | 296/214 |
| 6,194,855 B1 | * | 2/2001 | Lochmahr et al. | 318/283 |
| 6,320,342 B1 | * | 11/2001 | Yoshioka et al. | |
| 2001/0027146 A1 | * | 10/2001 | Spaziani et al. | |

FOREIGN PATENT DOCUMENTS

JP  60-272138  12/1985

\* cited by examiner

*Primary Examiner*—Jeffrey Donels
(74) *Attorney, Agent, or Firm*—Burns, Doane, Swecker & Mathis, LLP

(57) ABSTRACT

An open/close body control system for a vehicle can stabilize outputs of a pair of electrically operated motors (M1, M2) which drive an open/close body for a vehicle. Speeds of the electrically-operated motor (M1, M2) are synchronously controlled such that predictive positions (XLt+1, XRt+1) of electrically-operated motor (M1, M2) after a lapse of a unit time gradually approach a target position (XTRG) calculated based on present positions (XLt, XRt) and a target speed (ΔXTRG) of the electrically-operated motors (M1, M2).

5 Claims, 1 Drawing Sheet

MOVABLE BODY CONTROL SYSTEM FOR VEHICLE

BACKGROUND OF THE INVENTION

The present invention relates to a movable body control system for a vehicle which is applicable to an open/close body such as a top, a roof panel, a back window panel or a luggage panel of a convertible vehicle.

It is a known technique to arrange two motors at left and right sides and perform an open/close control of an open/close body using both motors. For example, in the open/close manipulation of a roof panel and a back window panel and the front opening manipulation of a luggage panel employed in a convertible vehicle, two motors which are arranged at left and right sides are operated and due to link mechanisms which are connected to the respective motors, the open/close manipulation of the roof panel and the back window panel and the front open/close manipulation of the luggage panel can be performed.

Japanese Patent Publication No. 2684/1991 discloses a control method of two motors for opening or closing a holding top for a vehicle. This example is provided with rotation synchronization correction means which synchronizes the rotational speeds of both motors by reducing the rotational speed of one motor out of both motors. To be more specific, in controlling these two motors, the rotational speed of one motor is reduced to the rotational speed of the other motor thereby these motor are synchronized. However, in this example, since the rotational speed of one motor is decreased so as to synchronize this rotational speed to the rotational speed of the other motor, when this control is excessively performed, it may give rise to the stop of motor.

Further, even if the excessive control may be prevented, the rotational speed cannot be restored and is held at the decreased value so that the control time may be prolonged.

On the other hand, U.S. Patent Specification No. 4087731 discloses control means of two motors for moving a large machine which cannot be moved by a single motor. In this example, present positions and present speeds of two motors, that is, left and right motors are detected and the present speeds of both motors are controlled such that the difference between a target position preset at each motor and a present position can be eliminated and the present position of each motor becomes the target position. However, in this example, the present position is made to become the preset target position by controlling the present speed, when the difference between the present position and the target position of one motor becomes extremely large as in a case where an external force is applied to either one of the motors or the like, the control of the present rotational speed of one motor must be performed in a wide scale and hence, it becomes difficult to ensure the smooth movement of the large machine.

Accordingly, it is an object of the present invention to provide an open/close body control system for a vehicle which can overcome drawbacks of the above-mentioned conventional techniques.

SUMMARY OF THE INVENTION

To solve the above-mentioned drawbacks, the present invention basically adopts technical means which calculates a target position based on positions of both motors and preset target speeds.

To be more specific, the present invention provides an open/close body control system which comprises at least two electrically-operated motors rotating a drive shaft for supporting an open/close body by way of a speed reduction mechanism, a device indicating the rotational directions of motors, rotation sensors being provided to respective motors and generating pulse signals synchronized with the rotational speeds of the motors, target speed setting means setting target speeds of respective motors, means for calculating positions and speeds of respective motors based on signals from the rotation sensors, means for calculating a target position after a lapse of a unit time based on positions and the target speeds of respective motors, means for calculating predictive positions after a lapse of a next unit time based on positions and speeds of respective motors, and synchronous control means for determining an output amount of the motors by comparing the calculated target positions with the predictive positions. In this technical means, the target positions are varied corresponding to the present positions of the motors. Accordingly, the control of the present speeds of the motors can be restricted to a small scale and hence, the smooth movement of the open/close body for a vehicle can be achieved.

DETAILED DESCRIPTION OF THE PREFERRED EMBODIMENTS

Figure 1:
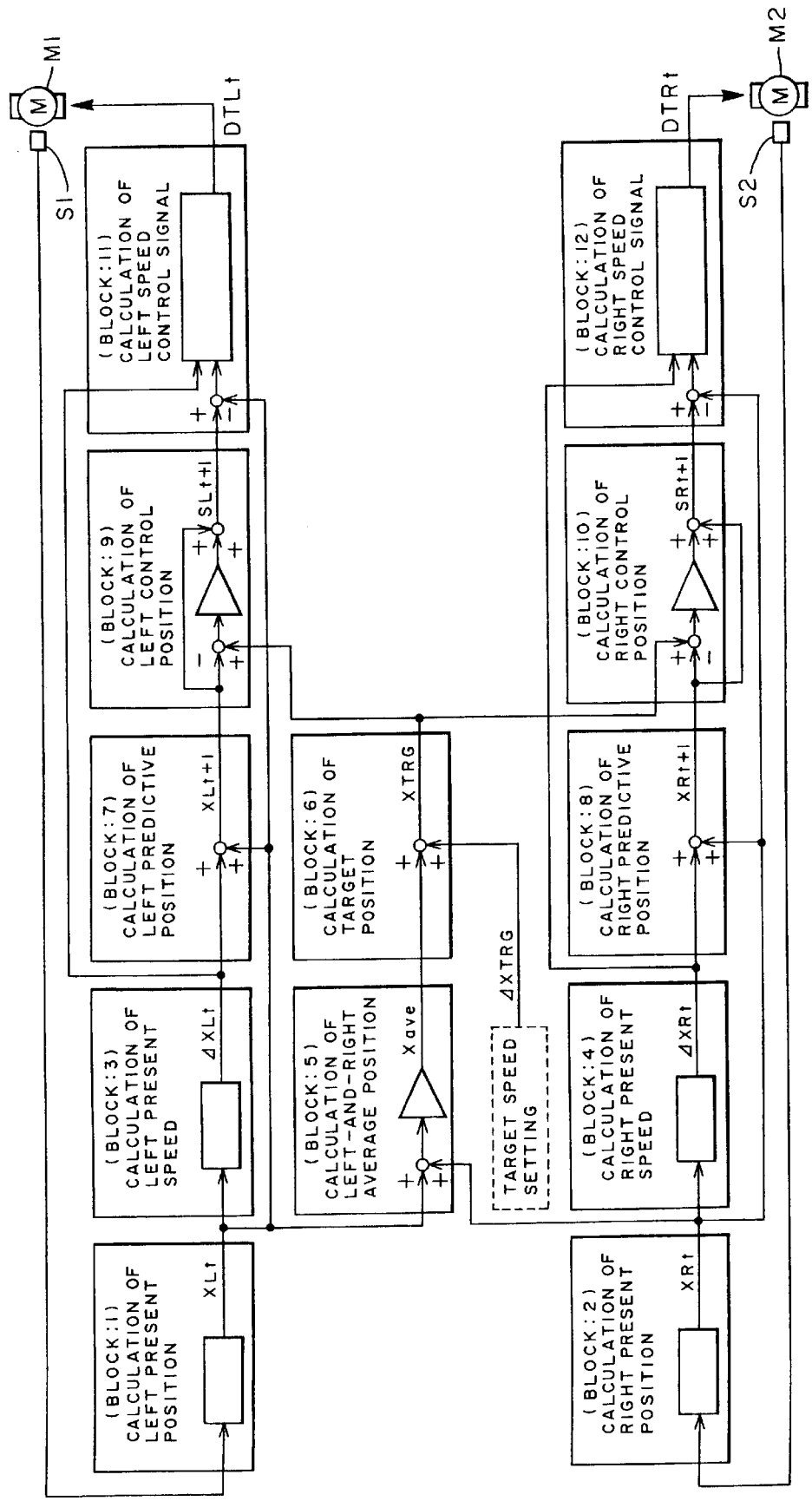
FIG. 1 is control block diagram for synchronizing left and right motors in an open/close body control system for a vehicle.

FIG. 1 shows a control block diagram which is suitable for an open/close control of a roof panel and a back window panel for a convertible vehicle. This drawing shows the operation of an ECU to which drive circuits (not shown in the drawing) of left and right motors M1, M2 which constitute drives sources for left and right roof link mechanisms (not shown in the drawing) for opening and closing the roof panel and the back panel are electrically connected by way of an output interface (not shown in the drawing). To the ECU, Hall ICs S1, S2 which output pulse signals corresponding to (synchronous with) the rotational speeds of the left and right motors M1, M2 are electrically connected through an input interface (not shown in the drawing). Further, various switches such as an open/close manipulation switch are electrically connected to the ECU. In the drawing, symbols have following meanings.

XLt means a left position, XRt means a right position, ΔXLt means a left speed, ΔXRt means a right speed, Xave means an average of left and right positions, VTRG indicates a target speed, XTRG indicates a target position, XLt+1 means a left predictive position, XRt+1 means a right predictive position, SLt+1 means a left control position, SRt+1 means a right control position, DTLt means a left speed control signal, and DTRt means a right speed control signal.

In FIG. 1, a block 1 calculates the present position XLt of the left motor M1 based on pulse signals fed from the Hall IC S1 mounted on the left motor M1 and a block 2 calculates the present position XRt of the right motor M2 based on pulse signals fed from a Hall IC S2 mounted on the right motor M2. The Hall ICs S1, S2 output pulses corresponding to the rotational speeds of respective motors M1, M2. Rotational condition detecting means are not limited to such Hall ICs S1, S2 and include means of any other forms so long as they can recognize the rotational condition (number of revolution, speed) of respective motors M1, M2.

A block 3 calculates the present speed ΔXLt of the left motor M1 based on the present position XLt of the left motor M1 calculated by the block 1 and a block 4 calculates the present speed ΔXRt of the right motor M2 based on the present position XRt of the right motor M2 calculated by the block 2.

A block 5 calculates the left/right average position Xave by averaging the present positions XLt, XRt of respective motors M1, M2 calculated by the blocks 1, 2. A block 6 calculates the target position XTRG after a lapse of a unit time based on the left/right average position Xave calculated by the block 5 and the target speed ΔXTRG. The target speed ΔXTRG is stored in a memory inside the ECU as a speed map or the like. The target speed ΔXTRG may be either a fixed value or a variable value.

A block 7 calculates the predictive position XLt+1 of the left motor M1 after a lapse of a unit time based on the present position XLt of the left motor M1 calculated by the block 1 and the present speed ΔXLt of the left motor M1 calculated by the block 3. A block 8 calculates the predictive position XRt+1 of the right motor M2 after a lapse of a unit time based on the present position XRt of the right motor M2 calculated by the block 2 and the present speed AXRt of the right motor M2 calculated by the block 4. The predictive positions XLt+1, XRt+1 are positions of respective motors M1, M2 after a lapse of a unit time when respective motors M1, M2 are kept driven at the present speed.

A block 9 calculates the control position SLt+1 of the left motor M1 after a lapse of a unit time by comparing the left predictive position XLt+1 calculated by the block 7 with the target position XTRG calculated by the block 6. A block 10 calculates the control position SRt+1 of the right motor M2 after a lapse of a unit time by comparing the right predictive position XRt+1 calculated by the block 8 with the target position XTRG calculated by the block 6. The control positions SLt+1, SRt+1 are set at positions in front of the target position XTRG by correction gains and these control positions SLt+1, SRt+1 approach the target position XTRG each time the control positions SLt+1, SRt+1 are calculated. Setting of such control positions SLt+1, SRt+1 is effective for suppressing the speed change of respective motors M1, M2 in a large scale.

A block 11 calculates the speed control signal DTLt for the left motor M1 to control the present speed ΔXLt of the left motor M1 calculated by the block 3 such that the present position XLt of the left motor M1 calculated by the block 1 becomes the control position SLt+1 of the left motor M1 calculated by the block 9 after a lapse of a unit time. Then, the block 11 transmits its output to the drive circuit of the left motor M1 through an output interface. A block 12 calculates the speed control signal DTRt for the right motor M2 to control the present speed ΔXRt of the right motor M2 calculated by the block 4 such that the present position XRt of the right motor M2 calculated by the block 2 becomes the control position SRt+1 of the right motor M2 calculated by the block 10 after a lapse of aunit time. Then, the block 12 transmits its output to the drive circuit of the right motor M2 through an output interface. Accordingly, the motors M1, M2 are driven at the speeds based on the speed control signals DTLt, DTRt calculated by the blocks 11, 12.

In this manner, the driving of the left and right motors M1, M2 is subjected to the synchronous control such that the predictive positions XLt+1, XRt+1 of the motors M1, M2 after a lapse of a unit time gradually approach the common target position XTRG of both motors M1, M2. Accordingly, the positional displacement between the left and right motors M1, M2 can be suppressed so that the smooth opening-closing operation of the roof panel and the back panel can be ensured. Further, the driving of the left and right motors M1, M2 is performed at the speeds close to the target speed ΔXTRG so that there exists no large difference in speed thereby the smoother opening-closing operation of the roof panel and the back panel can be ensured.

It may be possible to omit the calculation of the control positions in the blocks 9, 10 by the control system. That is, the speed control signals DTLt, DTRt of respective motors M1, M2 are calculated at the blocks 11, 12 by comparing the predictive positions XLt+1, XRt+1 of respective motors M1, M2 calculated at the blocks 7, 8 with the target position XTRG calculated at the block 6.

As many apparently widely different embodiments of the present invention can be made without departing from the spirit and scope thereof, it is to be understood that the invention is not limited to the specific embodiments thereof except as defined in the appended claims.

What is claimed is:

1. A movable body control system for a vehicle comprising:
   at least two electrically-operated motors rotating drive shafts for supporting an open/close body by way of speed reduction mechanisms,
   a device indicating the rotational directions of motors,
   rotation sensors being provided to respective motors and generating pulse signals synchronized with the rotation of the motors,
   target speed setting means setting target speeds of respective motors,
   means for calculating positions and speeds of respective motors based on signals from the rotation sensors,
   means for calculating a target position after a lapse of a next unit time based on positions and the target speeds of respective motors,
   means for calculating predictive positions after a lapse of a next unit time based on positions and speeds of respective motors, and
   synchronous control means for determining output amounts of the motors by comparing the calculated target positions with the predictive positions.

2. A movable body control system for a vehicle according to claim 1, wherein the target position of respective motors is calculated based on an average position of positions of respective motors and a preset target speed.

3. A movable body control system for a vehicle according to claim 1, wherein the movable body is an open/closed body composed of at least one of a top, a roof panel, a back window panel or a luggage panel of a convertible vehicle.

4. A movable body control system for a vehicle comprising:
   at least a pair of electrically-operated motors for performing opening and closing operations of an open/close body for a vehicle,
   means for calculating a target position based on present positions of a pair of electrically operated motors,
   means for calculating predictive positions based on present positions and present speeds of a pair of electrically operated motors,
   means for calculating control positions based on signals from the predictive position calculating means and signals from target position calculating means, and
   synchronous control means for calculating speed control signals based on signals from control position calculating means and controlling speeds of a pair of electrically-operated motors based on the signals.

5. A movable body control system for a vehicle according to claim 4, wherein the target position is calculated based on an average position of present positions of both motors and a preset target speed.

* * * * *